United States Patent
Drewes

(10) Patent No.: US 11,453,292 B2
(45) Date of Patent: Sep. 27, 2022

(54) SEMI-TRAILER, SEMI-TRAILER TRUCK AND METHOD FOR BRAKING A SEMI-TRAILER

(71) Applicant: SAF-HOLLAND GmbH, Bessenbach (DE)

(72) Inventor: Olaf Drewes, Aschaffenburg (DE)

(73) Assignee: SAF-Holland GmbH, Bessenbach (DE)

( * ) Notice: Subject to any disclaimer, the term of this patent is extended or adjusted under 35 U.S.C. 154(b) by 687 days.

(21) Appl. No.: 16/465,442

(22) PCT Filed: Nov. 28, 2017

(86) PCT No.: PCT/EP2017/080580
§ 371 (c)(1),
(2) Date: May 30, 2019

(87) PCT Pub. No.: WO2018/099878
PCT Pub. Date: Jun. 7, 2018

(65) Prior Publication Data
US 2019/0389313 A1    Dec. 26, 2019

(30) Foreign Application Priority Data
Dec. 2, 2016 (DE) .................... 10 2016 123 350.1

(51) Int. Cl.
| B60L 7/26 | (2006.01) |
| B60K 1/04 | (2019.01) |
| B60K 7/00 | (2006.01) |
| B60L 7/00 | (2006.01) |
| B62D 59/04 | (2006.01) |

(52) U.S. Cl.
CPC ................... *B60L 7/26* (2013.01); *B60K 1/04* (2013.01); *B60K 7/0007* (2013.01); *B60L 7/003* (2013.01); *B62D 59/04* (2013.01); *B60K 2001/0444* (2013.01); *B60L 2200/28* (2013.01); *B60Y 2200/147* (2013.01)

(58) Field of Classification Search
CPC .... B60L 7/26; B60L 7/24; B60L 7/003; B60L 2200/28; B60K 1/04; B60K 7/0007; B60K 2001/0444; B62D 59/04
See application file for complete search history.

(56) References Cited

U.S. PATENT DOCUMENTS

| 2002/0163251 A1 | 11/2002 | Crombez et al. |
| 2004/0122579 A1 | 6/2004 | Ashizawa et al. |
| 2005/0000739 A1 | 1/2005 | Leclerc |
| 2006/0000207 A1 | 1/2006 | Rush |

(Continued)

FOREIGN PATENT DOCUMENTS

| CN | 103502031 A | 1/2014 |
| DE | 102004029661 A1 | 1/2006 |

(Continued)

OTHER PUBLICATIONS

Adgero Ltd; Kinetic Energy Recovery for Trucks; 2016; entire document.

(Continued)

*Primary Examiner* — Anne Marie M Boehler
(74) *Attorney, Agent, or Firm* — Price Heneveld LLP

(57) ABSTRACT

A semitrailer includes a wheel and an electric machine for driving the wheel, wherein the electric machine is configured so as to be operable as an electromotive brake in a braking state.

20 Claims, 1 Drawing Sheet

(56) References Cited

U.S. PATENT DOCUMENTS

| | | | |
|---|---|---|---|
| 2007/0193795 A1 | 8/2007 | Forsyth | |
| 2008/0174174 A1 | 7/2008 | Burns et al. | |
| 2011/0042154 A1 | 2/2011 | Bartel | |
| 2011/0094807 A1 | 4/2011 | Pruitt et al. | |
| 2011/0304198 A1* | 12/2011 | Cottrell, V | B60T 13/586 303/2 |
| 2013/0162009 A1* | 6/2013 | Mitts | B60L 7/26 303/3 |
| 2015/0060160 A1* | 3/2015 | Kerschl | B60L 9/00 180/54.1 |
| 2016/0318421 A1 | 11/2016 | Healy | |
| 2016/0325628 A1* | 11/2016 | Okano | B60W 30/18109 |
| 2016/0355167 A1* | 12/2016 | Erban | B60L 7/26 |
| 2017/0217303 A1* | 8/2017 | Widek | B60K 6/52 |

FOREIGN PATENT DOCUMENTS

| | | |
|---|---|---|
| DE | 60114140 T2 | 7/2006 |
| DE | 202005020065 | 11/2006 |
| DE | 102008001565 A1 | 11/2009 |
| EP | 2394890 | 12/2011 |
| EP | 2899101 | 7/2015 |
| EP | 2651678 | 8/2015 |
| FR | 3023533 A1 | 1/2016 |

OTHER PUBLICATIONS

European Patent Office; International Search Report; dated Mar. 7, 2018.

* cited by examiner

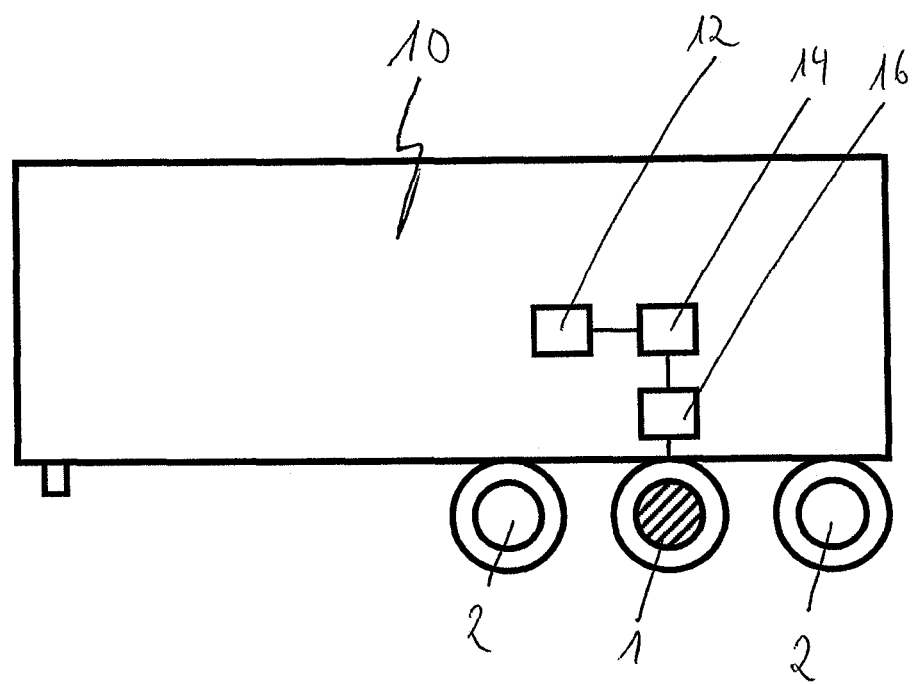

SEMI-TRAILER, SEMI-TRAILER TRUCK AND METHOD FOR BRAKING A SEMI-TRAILER

BACKGROUND OF THE INVENTION

The present invention relates to a semitrailer, a semitrailer truck, and a method for braking a semitrailer.

Semitrailer trucks with a semitrailer tractor and a semitrailer or trailer are well known from the prior art. Typically, here, the semitrailer is towed by the semitrailer tractor, into which a drive is integrated. Furthermore, semitrailer trucks are known whose semitrailers have their own drive. For this purpose, the semitrailers preferably have wheel-specific drive devices, for example in the form of electric machines. However, This system composed of the wheel, on the one hand, and the wheel-specific drive device, on the other hand, have proven to disadvantageously consume structural space, in particular in cases in which a transmission is additionally provided. The structural-space-consuming systems composed of wheel and drive device in this case reduce in particular a possible stowage space for the semitrailer.

It is an object of the present invention to provide a semitrailer which is improved in relation to the prior art, in particular with regard to the space requirement thereof for the drive device and the wheel.

SUMMARY OF THE INVENTION

The invention encompasses a semitrailer, in particular for or of a utility vehicle, comprising a wheel and an electric machine for driving the wheel, wherein the electric machine is configured so as to act or be operable as an electromotive brake in a braking state. By contrast to the prior art, the electric machine, which according to the invention is operated as an electromotive brake, advantageously makes it possible to dispense with a brake device, in particular a mechanical brake device. In this way, structural space can be saved, and the system composed of wheel and electric machine can be of correspondingly small dimensions for the largest possible stowage space in the semitrailer. Alternatively, the structural space created can be made available for additional components, such as for example a transmission. In particular, it has proven to be advantageous that the integration of the electric machine into the semitrailer, in particular onto a chassis of the semitrailer, is simplified in relation to systems with an additional brake device. Furthermore, there is no need for cumbersome uninstallation of the electric machine as a whole, which would otherwise generally be necessary in the event of an exchange of wearing parts of the brake device, for example of a brake disc. The result is that cumbersome and complicated servicing steps, for which specially trained personnel would be required, are advantageously eliminated. The elimination of a brake device furthermore has a positive effect on the overall weight and the costs of the semitrailer. It is furthermore conceivable for the electric machine to be provided for demand-dependent drive. That is to say, the electric machine is configured such that it can switch or be switched, in particular can switch in demand-dependent or controlled fashion, between driving operation, in which the electric machine drives the wheel, braking operation, in which the electric machine brakes the wheel, and idle operation, in which the electric machine is decoupled from the wheel. In this way, a vehicle driver can for example determine in what situations the electric machine is to be operated in idle operation or in driving operation. The electric machine is in particular activated for braking the semitrailer when the semitrailer is in motion. It is also conceivable for the wheel that is driven by the electric machine to comprise an additional brake device, for example a mechanical device, which is actuatable exclusively for immobilizing the wheel in parking operation, that is to say in a state in which the semitrailer is parked. In such an embodiment, it is advantageously possible for the number of times the electric machines have to be uninstalled for the exchange of wearing parts to be reduced, because the brake device is subjected to less load and, accordingly, the time between two exchanges of wearing parts is increased. For example, the mechanical brake as a disk brake. Provision is made in particular whereby the wheel is connected indirectly or directly to a rotatable part or to a rotor of the electric machine.

In particular, provision is made whereby the electric machine is configured so as to serve or function as sole brake device for the wheel and/or the axle, that is to say no additional or further brake device is provided at the wheel or at the axle. This does not rule out a brake device, for example a mechanical or hydraulic brake device, being provided at other axles or wheels, in particular non-driven wheels. The wheel driven by means of the electric machine, or the driven axle, expediently has no brake device. Thus, only the electric machine acts as brake device.

In a further embodiment of the present invention, provision is made whereby the electric machine is an asynchronous machine or a synchronous machine. Here, during driving operation, the electric machine is activated such that a rotor of the electric machine rotates relative to a stator. For this purpose, it is the case in particular that coils integrated into the electric machines have an electrical current applied thereto in targeted fashion, that is to say in a phase-offset manner with respect to one another.

Provision is expediently made whereby the electric machine is designed such that the asynchronous motor or the synchronous motor can be switched to generator operation for braking purposes. The electric machine operated in generator operation enables the rotor to be braked relative to the stator, whereby the rotation of the wheel connected to the rotor is advantageously counteracted.

Provision is preferably made whereby the electric machine acts or is operable as a recuperation brake in the braking state. In this way, electrical energy can be recovered during the braking of the semitrailer. For this purpose, the semitrailer preferably comprises an energy storage cell which is in particular connected in electrically conductive fashion to the electric machine. The electrical energy stored in the energy storage cell can then be used again for example during driving operation for drive purposes or for the supply to further components of the semitrailer, such as for example a lighting system of the semitrailer.

In a further embodiment of the present invention, provision is made whereby the electric machine is adjacent to the wheel or drive and axle with two, preferably oppositely situated wheels. An adjacent arrangement of the electric machine at the wheel is to be understood in particular to mean one in which a spacing between the driven wheel and the electric machine corresponds substantially to a value between 2% and 35%, preferably a value between 5% and 15% and particularly preferably a value between 2% and 7.5% of a total width of the semitrailer measured in a transverse direction of the semitrailer. It is also conceivable for the arrangement of the drive unit or of the electric machine to be dependent on the structural space boundary conditions predefined by the respective semitrailer. Correspondingly, greater independence or flexibility is achieved in the design of the semitrailer, because the design is not determined or delimited by a specific design embodiment of the drive unit.

Provision is particularly preferably made whereby the electric machine is arranged in or on the semitrailer so as to be directly accessible when the wheel driven by the electric machine is removed. It is furthermore conceivable that an electric machine which is provided for driving an axle, that is to say two wheels, is arranged in a region adjacent to the wheel. It is also conceivable that, in this case, a counterweight is provided in the semitrailer on the opposite side in order to equalize the weight distribution.

Provision is expediently made whereby the electric motor is designed such that, for emergency braking, an electrical short circuit, in particular armature short-circuit braking, can be performed. By means of the electrical short circuit, it is possible to trigger extremely prompt braking, with which it is advantageously possible to react relatively quickly to an emergency situation.

In a further embodiment of the present invention, provision is made whereby a transmission is arranged between the driven wheel and the electric machine. By means of as high as possible a transmission ratio by means of the transmission, it is possible in turn for the electric machine to be dimensioned to be smaller, by structural space, costs and weight can be saved for the drive unit. In particular, provision is made whereby the transmission is integrated into the electric machine. This not only simplifies the installation of the drive unit but also permits the most optimum possible coordination of the transmission with the electric machine. Furthermore, the structural space requirement for the drive unit as a whole can be further reduced.

Provision is preferably made whereby the transmission has a transmission ratio between 1.5 and 10, preferably between 10 and 25 and particular preferably between 25 and 45, that is this a has a step-down transmission ratio. By means of the corresponding reset transmission ratio, it is possible for the dimensioning of the electric machine to be configured and influenced.

Provision is furthermore made whereby the semitrailer has a control device for controlling the electric machine and in particular a communication device for communicating with a semitrailer tractor. By means of the control device, the electric machine can advantageously be switched from driving operation or idle operation to braking operation. For this purpose, the control device is connected to the electric machine or is integrated into the electric machine. In particular, here, the control device coordinates the current supply to the individual coils of the electric machine. By means of the communication device, it is furthermore possible for an information item relating to a braking process initiated in the semitrailer tractor to be communicated to the control device. Here, it is conceivable that the communication between the semitrailer tractor and the community device takes place wirelessly or via an interface, for example a cable. It is also conceivable for the control device to be informed by the communication device of an intensity of the braking process, that is to say whether the brake in the semitrailer tractor has been actuated with relatively high or low intensity, whereupon the control device adapts the braking by the electric machine correspondingly. Provision is furthermore made whereby the control device is configured so as to trigger an electrical short circuit in the event of an emergency braking operation.

Provision is expediently made whereby the semitrailer has a non-driven wheel in addition to the driven wheel, wherein the non-driven wheel preferably has a brake device which is synchronized with an operating state of the electric machine. In this way, the braking action for the semitrailer can be distributed between multiple brake devices. The brake device is preferably a mechanical brake device, for example a disk brake. In particular, provision is made whereby wheels in each case assigned to one axle and situated opposite one another are either non-driven or can be driven by means of electric machines. Furthermore, provision is made whereby the control device controls both the braking by means of the electric machine and the braking by means of the mechanical brake device. It is also conceivable that the control device is configured such that the braking by means of the mechanical brake device takes place with a time delay in relation to the electromotive braking. In this way, a degree of wear of the mechanical brake device can be reduced, whereby the service life of wearing parts, which must otherwise be exchanged, is advantageously lengthened, because the brake loading for the mechanical brake device takes effect after the electric machine has already commenced the braking operation. For example, the time delay in relation to the electromotive braking lies in a time interval between 0.2 s and 0.8 s, preferably in a time interval between 0.4 s and 0.9 s and particular preferably in a time interval between 0.6 and 1.1 s. It is also conceivable that the control device is configured such that the mechanical brake device is actuated if the intensity of the braking process performed in the semitrailer exceeds a threshold value. In such a situation, the mechanical brake devices act first to assist in an intensive braking process, and is preserved during braking processes below the threshold value.

In particular, provision is made whereby the actuation of the brake device of the non-driven wheels or axles is, by means of the control device, coordinated with the actuation of the electric machine. In this way, it is advantageously possible for the brake device, in particular the mechanical brake device, to be activated when required. Provision is furthermore made whereby a component of a degree of braking by the electric machine is greater than the respective component or the summed components of a degree of braking by the brake devices at the non-driven wheels or axles. Preferably, a component of the degree of braking by the one or more brake devices in relation to the component of the degree of braking by the electric machine assumes a value between 0.1 and 0.4, preferably between 0.05 and 0.25 and particular preferably between 0.05 and 0.1. It is furthermore conceivable that the component of the degree of braking by the one or several brake devices, in particular at the non-driven wheels, in relation to the component of the degree of braking by the electric machine varies during the braking operation. Here, it is preferable if the component of the degree of braking by the one or more brake devices, in particular of the mechanical brake devices, increases over time during the braking process. In this way, the mechanical brake devices are correspondingly more highly loaded during a long, that is to say intensive braking process than during a short braking operation.

In a further embodiment of the present invention, provision is made whereby the non-driven wheel comprises a brake device which is operable exclusively during emergency braking and/or which is provided for immobilization. In this way, the wear of the wear-susceptible mechanical brake devices can advantageously be further reduced. Here, a person skilled in the art will understand emergency braking to mean an actuation of the brake device with an intensity which lies above a set threshold value. Here, a brake device provided for immobilization is provided for locking the wheels during parking operation of the semitrailer in order to thus prevent the semitrailer from inadvertently rolling away—for example in a situation in which the semitrailer is positioned on inclined ground.

In a further embodiment of the present invention, provision is made whereby the control device is designed such that, to stabilize a semitrailer truck which comprises the semitrailer and the semitrailer tractor, said control device brakes one or more wheels. Here, in particular, provision is made whereby, by means of targeted, preferably automatic, braking by means of the electric machine during driving, a fishtailing movement of the semitrailer is counteracted. A fishtailing movement is in particular the result of a transverse offset of an axle of the semitrailer tractor in relation to an axle of the semitrailer in a direction running perpendicular to the direction of travel. Stabilization of the semitrailer is then to be understood to mean that this transverse offset is counteracted. The control unit is preferably configured such that the ratio between transverse offset and a total width of the semitrailer measured in the transverse direction of the semitrailer assumes, at most, a value between 2% and 10%, preferably between 6% and 10% and particular preferably between 2% and 5%.

A further subject of the present invention is a semitrailer truck comprising a semitrailer tractor and a semitrailer according to the invention. All features described for the semitrailer according to the invention, and the advantages thereof, can likewise be transferred analogously to the semitrailer truck according to the invention, and vice versa.

The object is furthermore achieved by means of a method for braking a semitrailer according to the invention, wherein the electric machine is operated as an electromotive brake in order to brake the wheel. All features described for the semitrailer according to the invention, and the advantages thereof, can likewise be transferred analogously to the method according to the invention, and vice versa.

In a further embodiment of the present invention, provision is made whereby the electric machine, which is designed as a synchronous machine or as an asynchronous machine, is switched to generator operation for braking purposes.

BRIEF DESCRIPTION OF THE DRAWINGS

Further advantages and features will emerge from the following description of preferred embodiments of the subject matter according to the invention with reference to the appended FIGURE. Here, individual features of the individual embodiment may be combined with one another within the scope of the invention.

In the FIGURE:

The FIGURE shows a semitrailer according to a preferred embodiment of the present invention.

DETAILED DESCRIPTION OF THE PREFERRED EMBODIMENTS

The FIGURE schematically shows a semitrailer 10 according to a preferred embodiment of the present invention. In particular, the semitrailer 10 forms a semitrailer truck together with a semitrailer tractor. Here, provision is made whereby the semitrailer truck is, during driving operation, driven for propulsion not only by means of a drive integrated in the semitrailer tractor but also by means of an electric machine 16 integrated into the semitrailer 10. Here, provision is preferably made whereby the electric machine 16 is provided for wheel-specific drive, that is to say an electric machine 16 is assigned to exactly one wheel. It is also conceivable for an electric machine 16 to be provided for driving two wheels 1 which are connected by means of an axle, in particular wheels which are connected by means of an axle with a differential transmission. For example, the electric machine 16 is an asynchronous machine or a synchronous machine. In the embodiment illustrated, the semitrailer 10 has three axles, wherein a wheel 1 of the middle axle can be driven by an electric machine 16, preferably as required, and the axles arranged in front of and behind the middle axle as viewed in a direction of forward travel have non-driven wheels 2.

Here, provision is made whereby the electric machine 16 is configured so as to be operable as an electromotive brake for braking purposes. That is to say, the electric machine 1, which during driving operation is operated as a synchronous machine or as an asynchronous machine is switched to generator operation for braking purposes. Here, provision is preferably made whereby the energy obtained during generator operation is returned into an energy store of the semitrailer 10, that is to say the electric machine is used as a recuperation brake in the braking state. Aside from the energy recovery, it is furthermore proven to be advantageous that no dedicated brake device, such as for example a disk brake, is required at the wheel 1 which is driven by the electric machine 16 during traction operation. Without a brake device, in particular mechanical brake device, there is also no need for uninstallation of the electric machine 16, which would otherwise be required for the exchange of wearing parts, such as for example a brake disc. Furthermore, in particular, provision is made whereby the semitrailer 10 comprises a control device 14 for controlling the electric machine 16. In particular, the control device 14 is designed so as to switch the electric machine 16 from traction operation to braking operation. For this purpose, the control device 14 is preferably connected to the electric machine 16 or integrated into the electric machine 16. Furthermore, the control device 14 is connected to a communication device 12 for communication with the semitrailer tractor. In this way, a braking operation by means of the electric machine 16 can be coordinated or synchronized with a braking process initiated in the semitrailer tractor. Here, it is conceivable that the communication between the semitrailer tractor and the communication device takes place by means of a wireless radio connection or a cable connection.

Furthermore, provision is made whereby the non-driven wheels 2 comprise brake devices, such as for example disk brakes, which are configured so as to be operable exclusively in the event of an emergency braking operation and/or in immobilizing the wheel in a parking situation. That is to say, during normal driving operation, a braking process in the semitrailer 10 is preferably performed exclusively by means of the electric machine 16, which is operated as an electromotive brake. In this way, a degree of wear of the mechanical brake device of the non-driven wheels can advantageously be reduced. For example, in this way, a wearing volume of the friction partners can be reduced, and/or internal ventilation provided for cooling purposes can be dispensed with. This proves to be advantageous both for structural space and with regard to a material requirement in the production and maintenance of the brake device 16 provided for the semitrailer 10. The brake devices of the non-driven wheels 2 are preferably likewise connected to the control device 14, whereby an actuation of the mechanical brake device can be initiated in a situation-dependent manner.

Furthermore, provision is made whereby a transmission is arranged between the driven wheel 1 and the electric machine 16 in order to realize the highest possible transmission ratio. The transmission preferably has a transmission ratio of between 1.5 and 3, preferably between 1.8 and 3.5 and particular preferably between 2 and 4.

Provision is furthermore made whereby a spacing between the driven wheel 1 and the electric machine corresponds substantially to a value between 2% and 40%, preferably a value between 5% and 15% and particularly preferably a value between 2% and 10%, of the total width of the semitrailer 10 measured in the transverse direction of the semitrailer. Since a mechanical brake device can be dispensed with, the electric machine can be arranged relatively close to the wheel, whereby the overall system composed of wheel and electric machine takes up the least possible structural space. It is furthermore conceivable for the driven wheel 1 to be arranged in the final third or final quarter of the semitrailer as viewed in a direction of travel.

LIST OF REFERENCE DESIGNATIONS

1 Wheel
2 Non-driven wheel
10 Semitrailer
12 Communication device
14 Control device
16 Electric machine

The invention claimed is:

1. A semitrailer for a utility vehicle, comprising:
a driven wheel; and
an electric machine configured to drive the driven wheel;
wherein the electric machine is configured so as to be operable as an electromotive brake in a braking state;
wherein the semitrailer includes a non-driven wheel in addition to the driven wheel;
wherein the non-driven wheel includes a mechanical brake device;
wherein the mechanical brake device is configured to brake with a time delay in relation to an electromotive braking of the electromotive brake; and
wherein the electric machine acts as a brake device for the driven wheel, and the electric machine acts as the only brake device on the driven wheel.

2. The semitrailer as claimed in claim 1, wherein the electric machine includes an asynchronous machine or a synchronous machine.

3. The semitrailer as claimed in claim 2, wherein the electric machine is configured to brake the driven wheel via an axle.

4. The semitrailer as claimed in claim 3, wherein the electric machine is configured as a recuperation brake in the braking state.

5. The semitrailer as claimed in claim 4, wherein the electric machine is adjacent to the driven wheel.

6. The semitrailer as claimed in claim 4, wherein the driven wheel is one of two driven wheels and wherein the electric machine is configured to drive the two driven wheels via an axle.

7. The semitrailer as claimed in claim 5, further comprising:
a transmission arranged between the driven wheel and the electric machine.

8. The semitrailer as claimed in claim 7, further comprising:
a control device configured to control the electric machine; and
a communication device for communication with a semitrailer tractor.

9. The semitrailer as claimed in claim 8, wherein the mechanical brake device is synchronized with an operating state of the electric machine.

10. The semitrailer as claimed in claim 9, wherein the brake device of the non-driven wheels is actuated by the control device and coordinated with the actuation of the electric machine.

11. The semitrailer as claimed in claim 10, wherein the mechanical brake device is operable exclusively during emergency braking and/or for immobilization.

12. The semitrailer as claimed in claim 1, wherein the electric machine is configured to brake the driven wheel via an axle.

13. The semitrailer as claimed in claim 1, wherein the electric machine is configured as a recuperation brake in the braking state.

14. The semitrailer as claimed in claim 1, wherein the driven wheel is one of two driven wheels and wherein the electric machine is configured to drive the two driven wheels via an axle.

15. The semitrailer as claimed in claim 1, further comprising:
a transmission arranged between the driven wheel and the electric machine.

16. The semitrailer as claimed in claim 1, further comprising:
a control device configured to control the electric machine; and
a communication device for communication with a semitrailer tractor.

17. The semitrailer as claimed in claim 1, wherein the mechanical brake device is synchronized with an operating state of the electric machine.

18. The semitrailer as claimed in claim 1, wherein the brake device of the non-driven wheels is actuated by the control device and coordinated with the actuation of the electric machine.

19. The semitrailer as claimed in claim 1, wherein the mechanical brake device is operable exclusively during emergency braking and/or for immobilization.

20. A semitrailer truck comprising a semitrailer tractor and a semitrailer as claimed in claim 1.

* * * * *

UNITED STATES PATENT AND TRADEMARK OFFICE
CERTIFICATE OF CORRECTION

| | |
|---|---|
| PATENT NO. | : 11,453,292 B2 |
| APPLICATION NO. | : 16/465442 |
| DATED | : September 27, 2022 |
| INVENTOR(S) | : Drewes |

It is certified that error appears in the above-identified patent and that said Letters Patent is hereby corrected as shown below:

In the Specification

Column 1, Line 16:
"This" should be – this –

Column 3, Line 35:
"particular" should be – particularly –

Column 3, Line 36:
Delete "a" (1st occurrence)

Column 3, Line 54:
"community" should be – control –

Column 4, Line 23:
"particular" should be – particularly –

Column 4, Line 45:
"particular" should be – particularly –

Column 5, Line 21:
"particular" should be – particularly –

Column 7, Line 6:
"particular" should be – particularly –

In the Claims

Column 8, Claim 10, Line 19:
"wheels" should be – wheel –

Signed and Sealed this
Fourteenth Day of March, 2023

Katherine Kelly Vidal
*Director of the United States Patent and Trademark Office*

Column 8, Claim 18, Line 49:
"wheels" should be – wheel –